(12) United States Patent
Oi et al.

(10) Patent No.: US 7,037,563 B2
(45) Date of Patent: May 2, 2006

(54) COPOLYMER

(75) Inventors: Nobuo Oi, Narashino (JP); Akihiro Kondo, Ichihara (JP); Tatsuya Miyatake, Ichihara (JP); Toshiki Mori, Osaka (JP)

(73) Assignee: Sumitomo Chemical Company Limited, Osaka (JP)

( * ) Notice: Subject to any disclaimer, the term of this patent is extended or adjusted under 35 U.S.C. 154(b) by 0 days.

(21) Appl. No.: 09/972,879

(22) Filed: Oct. 10, 2001

(65) Prior Publication Data
US 2002/0091217 A1    Jul. 11, 2002

(30) Foreign Application Priority Data
Oct. 12, 2000  (JP)  .............................. 2000-311778
Jul. 2, 2001   (JP)  .............................. 2001-200548

(51) Int. Cl.
B32B 1/08          (2006.01)
(52) U.S. Cl. .................. 428/36.9; 428/476.9; 428/518; 526/282; 526/347; 526/160; 526/161
(58) Field of Classification Search ............. 526/348.6, 526/126.6, 160–161, 282, 347; 428/476.9, 428/578, 36.9, 518
See application file for complete search history.

(56) References Cited
U.S. PATENT DOCUMENTS
3,383,349 A    5/1968   Grasley et al.
4,226,965 A   10/1980   Grigoriev et al.
5,844,055 A   12/1998   Brandt et al.
6,288,193 B1   9/2001   Iseki et al. ............... 526/348.6

FOREIGN PATENT DOCUMENTS
DE   199 51 277 A1   5/2000
EP   0 253 625 A1    1/1988
EP   0970976    *    1/2000
WO   WO 93/21242    10/1993

OTHER PUBLICATIONS
P. Longo et al., Macromol. Chem, 191, 2387-2396 (1990).
L.A. Nekhaeva et al., Polymer Science USSR, 32(9), pp. 1868-1872 (1990).
R. Mani, Polymer, 34(9), 1941 (1993).
Organometallic Catalysts and Olefin Polymerization New Millennium International Conference, Jun. 18-22, 2000, Oslo, Norway.

* cited by examiner

Primary Examiner—Patrick Joseph Ryan
Assistant Examiner—Jane Rhee
(74) Attorney, Agent, or Firm—Birch, Stewart, Kolasch & Birch, LLP

(57) ABSTRACT

A copolymer of ethylene and a vinyl compound (I) represented by the general formula $CH_2=CH-R$, wherein R is a saturated hydrocarbon group, a steric parameter Es of the substituent R is from −2.77 to −1.64 and a steric parameter B1 of the substituent R is from 1.53 to 2.90, a molded article comprising the same, an adhesive comprising the same as an effective ingredient an laminate comprising the same.

11 Claims, 16 Drawing Sheets

COPOLYMER

BACKGROUND OF THE INVENTION

1. Field of the Invention

The present invention relates to a copolymer suitable for an adhesive for polyolefin resins, damping material, molded article such as a film, sheet, pipe.

2. Description of Related Art

Generally, polymers used as stretched films, wrapping films or pipes are required to have viscoelasticity (elastic recoverability and delayed recoverability) and transparency as well as balance between flexibility and heat resistance like polyvinyl chloride. Polyvinyl chloride, however, is regarded as being problematic in relation to environmental pollution for the reason that it has a possibility to produce a harmful substance when burned. Though replacement of polyvinyl chloride with a polymer such as an ethylene copolymer is being studied now, it is an actual condition that any satisfactory substitute has not been obtained.

Further, When the copolymer is used as a protective film of a polyolefin resin such as a polyethylene, polypropylene or the like, an adhesion performance is required.

SUMMARY OF THE INVENTION

An object of the present invention is to provide a specific copolymer that is capable of having a constitution not containing any halogen regarded as being problematic from the viewpoint of environmental pollution, the copolymer being excellent in transparency, damping property, viscoelasticity, adhesiveness and balance between flexibility and heat resistance.

Another object of the present invention is to provide a molded article comprising said copolymer.

Further, another object of the invention is to provide an adhesive containing the copolymer as an effective ingredient.

Other objects and advantages of the present invention will be apparent from descriptions below.

Namely, the present invention relates to a copolymer of ethylene and a vinyl compound (I) represented by the general formula $CH_2=CH-R$, wherein R is a saturated hydrocarbon group, the steric parameter Es of the substituent R is from −2.77 to −1.64 and the steric parameter B1 of the substituent R is from 1.53 to 2.90, wherein the copolymer substantially has no crystallinity.

Further, the present invention relates to a copolymer of ethylene and the vinyl compound (I) above, wherein said copolymer has a structure in which carbon atoms substituted with the substituent R are separated from each other by one methylene group in the skeleton of the copolymer.

Further, the present invention provides a molded article comprising the copolymer, and an adhesive comprising the copolymer as an effective ingredient.

DETAILED DESCRIPTION OF THE INVENTION

Figure 1:
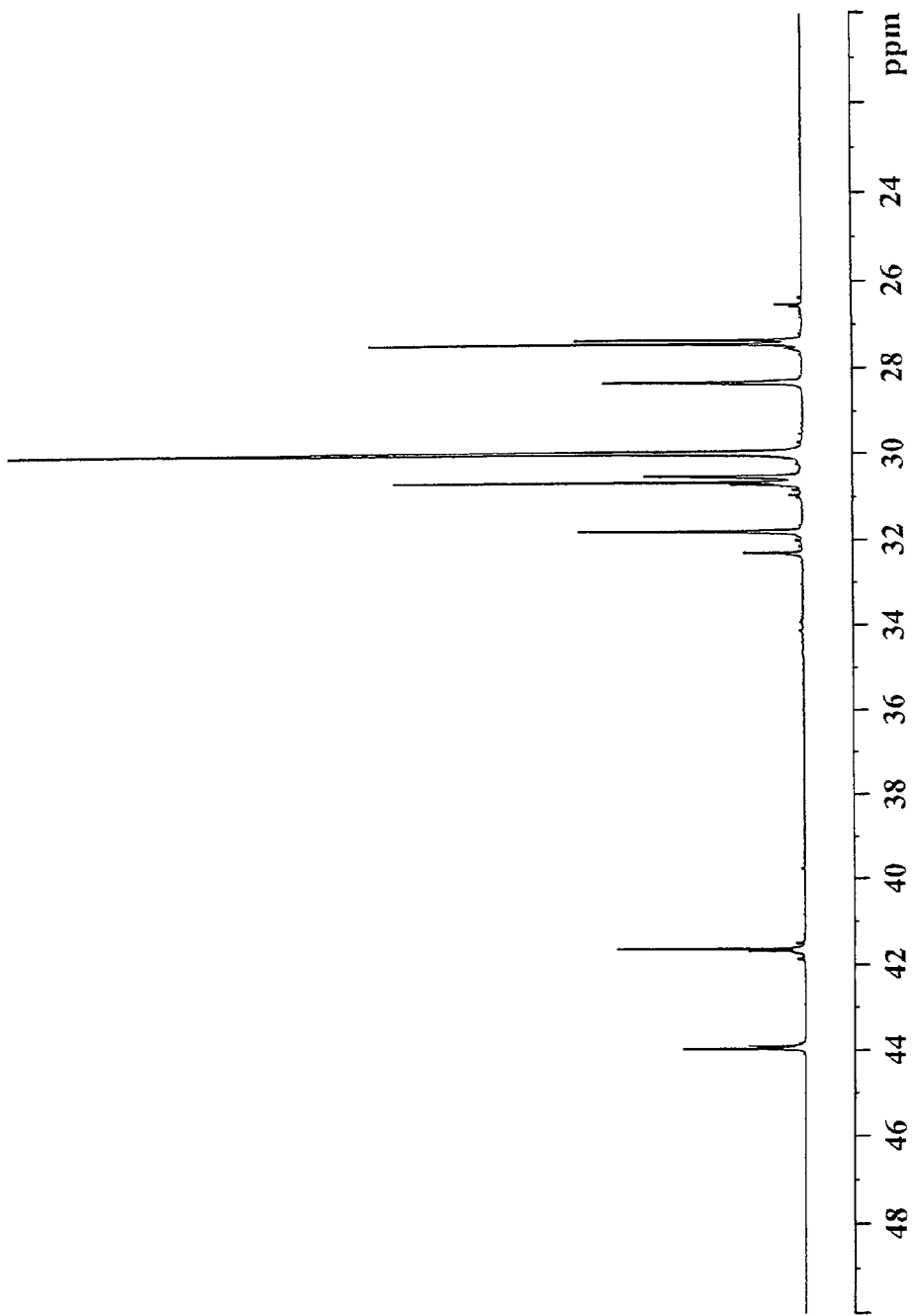
FIG. 1 is a $^{13}C$-NMR spectrum of the polymer obtained in Example 1.

The vinyl compound (I) used in the present invention is a vinyl compound represented by $CH_2=CH-R$, containing an unsaturated hydrocarbon group R of which steric parameters Es and B1 are within respective specified ranges.

Herein, the "steric parameters Es and B1" are parameters indicative of the steric bulkiness of a substituent (in detail, Es and B1 indicate three-dimensional extent and two-dimensional extent, respectively) and are determined by the method described in literature [C. Hansch and A. Leo: "Exploring QSAR Fundamentals and Applications in Chemistry and Biology" Chapter 3 (ACS Professional Reference Book, Washington, D.C. (1995))].

In the present invention, steric parameter Es of the substituent R is from −2.77 to −1.64, preferably −2.37 to −1.71, more preferably −2.22 to −1.75, while steric parameter B1 of the substituent R is from 1.53 to 2.90, preferably from 1.70 to 2.50.

When the parameter Es is less than −2.77, it may become difficult to obtain a copolymer, and when the parameter Es is more than −1.64, an elastic recoverability and delayed recoverability of a resulting copolymer may become inferior. When the steric parameter B1 is less than 1.53, an elastic recoverability and delayed recoverability of a resulting copolymer may become inferior. On the other hand, when the steric parameter B1 is more than 2.90, it may become difficult to obtain a copolymer.

Specific examples of the substituent R include a cyclohexyl group, cyclopentyl group, isopropyl group, sec-butyl group, and the like.

As the vinyl compound (I) used in the present invention, vinylcyclohexane (Es: −1.81, B1: 1.91), vinylcyclopentane (Es: −1.75, B1: 1.90), 3-methyl-1-butene (Es: −1.71, B1: 1.90), 3-methyl-1-pentene sec-butyl group (Es: −2.37, B1: 1.90) and the like are listed. Among them, vinylcyclohexane is particularly preferable. The copolymer of the present invention is preferably an amorphous copolymer having no crystallinity in substantial from the viewpoint of transparency.

It can be confirmed by no substantial indication of a melting point in a melting curve measured by a differential scanning calorimeter (DSC) that the copolymer has no crystallinity.

In the copolymer of the present invention, the content of a unit derived from the vinyl compound (I) copolymerized (referred to simply as "vinyl compound (I) unit") is preferably from 5 to 90 mol %. It is not preferable in terms of transparency when the content of the vinyl compound (I) unit in the copolymer is less than 5 mol % because the resulting copolymer may form crystal in its skeleton due to sequence of ethylene units. On the other hand, it is also not preferable in terms of transparency when the content of the vinyl compound (I) unit in the copolymer is more than 90 mol %, the resulting copolymer may form crystal in its skeleton due to sequence of the vinyl compound (I) unit.

Further, when the content of the vinyl compound (I) unit is relatively low in the above range, a copolymer suitable for a film or sheet excellent in transparency, viscoelasticity and flexibility and like plasticized polyvinyl chloride resin, is obtained. And, the content of the vinyl compound (I) unit is preferably 15 to 50 mol %, more preferably 20 to 40 mol %, particularly preferably 20 to 35 mol %.

On the other hand, when the content of the vinyl compound (I) units is relatively high in the above range, a copolymer excellent in damping property and heat resistance is obtained. And, the content of the vinyl compound (I) unit is preferably 40 to 90 mol %, more preferably 50 to 90 mol %, particularly preferably 60 to 85 mol %.

Moreover, from the viewpoint of adhesion performance, the content of the vinyl compound (I) unit is more preferably from 5 to 25 mol %, much more preferably from 10 to 20mol %, particularly preferably from 10 to 15 mol %.

Herein, the total content of the ethylene unit and the vinyl compound (I) unit is 100 mol %. The content of the vinyl compound (I) unit in the copolymer can be easily determined by a measurement using $^1$H-NMR spectrum or $^{13}$C-NMR spectrum.

The ethylene-vinyl compound (I) sequence in the polymer skeleton (inclusive of a branched polymer chain if present among molecular chains of the polymer) of the copolymer of the present invention is determined by $^{13}$C-NMR spectrum. In table 1, chemical shifts of various ethylene-vinyl compound (I) sequences are collected. In Table 1, measured values are those measured by the method described in Examples, while calculated value are those calculated by the method described in a literature (L. P. Linderman, J. Q. Adams: ANALYTICAL CHEMISTRY, Vol. 43, No. 10, 1245–1252, 1971).

TABLE 1

| Sequence | Measured Value | Calculated Value |
| --- | --- | --- |
| $S_{\alpha\alpha}$ | 34.2 | 34.1 |
| $S_{\alpha\gamma}$ | 32.4 | 32.3 |
| $S_{\alpha\delta}$ | 32.1 | 32.0 |
| $S_{\gamma\gamma} \cdot S_{\gamma\delta}$ | 30.7~30.2 | 30.5~30.2 |
| $S_{\delta\delta}$ | 30.0 | 30.0 |
| $S_{\beta\delta}$ | 28.3 | 27.8 |
| $S_{\beta\beta}$ | 26.3 | 25.3 |

Notation used herein such as $S_{\alpha\alpha}$ follows the rule described below.

In the copolymer skeleton of the copolymer of ethylene and the vinyl compound (I), a tertiary carbon atom bonded to the substituent R originating from the vinyl compound (I) and a secondary carbon atom are present. Attention is directed to a secondary carbon atom interposed between two tertiary carbon atoms, and such a secondary carbon atom in a position corresponding to the α-position from one tertiary carbon atom as well as to the α-position from the other tertiary carbon atom is referred to as $S_{\alpha\alpha}$. Likewise, for example, a secondary carbon atom in a position corresponding to the α-position from one tertiary carbon atom as well as to the γ-position from the other tertiary carbon atom is referred to as $S_{\alpha\gamma}$. Summary of such notation is as shown in Table 2, and the following structural formulae (1) and (2) show the positions of $S_{\alpha\alpha}$, $S_{\alpha\gamma}$ and $S_{\beta\beta}$.

TABLE 2

| Sequence | Position from one tertiary carbon atom | Position from the other tertiary carbon atom |
| --- | --- | --- |
| $S_{\alpha\alpha}$ | α-position | α-position |
| $S_{\alpha\gamma}$ | α-position | γ-position |
| $S_{\alpha\delta}$ | α-position | δ-position |
| $S_{\gamma\gamma}$ | γ-position | γ-position |
| $S_{\gamma\delta}$ | γ-position | δ-position |
| $S_{\delta\delta}$ | δ-position | δ-position |
| $S_{\beta\delta}$ | β-position | δ-position |
| $S_{\beta\beta}$ | β-position | β-position |

It is to be noted that a secondary carbon atom situated in a position (for example, ε-position) farther than the δ-position from a tertiary carbon atom is not referred to as $S_{\alpha\epsilon}$ or the like but is referred to as $S_{\alpha\delta}$ because such a position influences chemical shifts of the secondary carbon atom to substantially the same extent as the δ-position does.

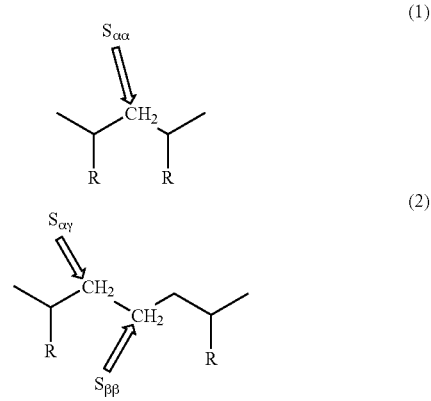

In the $^{13}$C-NMR spectrum of an ethylene-vinylcyclohexane copolymer, in which the content of the copolymerized vinylcyclohexane unit is 2 mol %, which has crystallinity, only four sorts of methylene-forming carbons, namely $S_{\alpha\delta}$ (32.1 ppm), $S_{\gamma\delta}$ (30.7ppm), $S_{67\ \delta}$ (30.0 ppm) and $S_{\beta\delta}$ (28.3 ppm), were observed, and it was found that there exists only a structure such that the vinylcyclohexane unit is isolated in the polymer skeleton (that is, carbon atoms substituted with cyclohexyl groups are separated from each other by four or more methylene groups.) The values of chemical shifts in Table 1 do not vary very much even when the vinyl compound (I) is vinylcyclopentane, 3-methylbutene-1 or 3-methylpentene-1.

The copolymer of the present invention preferably has a structure in which carbon atoms substituted with substituents R originating from the vinyl compound (I) are separated from each other by one methylene group. In other words, in the $^{13}$C-NMR spectrum of another preferable copolymer according to the present invention, there is observed a peak reflecting a methylene group represented by $S_{\alpha\alpha}$. Such a case is indicative of the presence of what is a so-called "head-to-tail bond" sequence in which two units originating from the vinyl compound (I) are successively bonded in the same direction to each other in the polymer backbone. When a copolymer has such bonding, the content of the vinyl compound (I) can be controlled in wide range and the copolymer is excellent in viscoelasticity, flexibility, adhesiveness, heat resistance and damping property, and hence is preferable.

From the viewpoint of weatherability, the copolymer of the present invention is free of any double bond in all the molecular structures (including substituent R) of polymer except terminals of the copolymer. A copolymer containing double bonds in molecular structures of polymer is inferior in thermal stability and hence tends to raise a problem of formation of fish eyes due to gelation occurring during a molding process, or the like.

From the viewpoint of mechanical strength and transparency, the copolymer preferably has a molecular weight distribution (Mw/Mn), which is expressed as a ratio of weight average molecular weight (Mw) to number average molecular weight (Mn), of 1.5 to 4.0, more preferably 1.5 to 3.5, particularly preferably 1.5 to 3.0.

Further, from the viewpoint of mechanical strength, the copolymer preferably has a weight average molecular weight (Mw) of from 10,000 to 1,000,000, more preferably from 30,000 to 500,000, particularly preferably from 40,000 to 400,000.

In addition, from the viewpoint of adhesiveness, the copolymer preferably has a weight average molecular weight (Mw) of from 1,000 to 300,000, more preferably from 2,000 to 100,000, particularly preferably from 5,000 to 50,000.

Moreover, from the viewpoint of mechanical strength, the copolymer preferably has an intrinsic viscosity [c] measured in tetralin at 135° C. of 0.25 to 10.0 dl/g, more preferably 0.3 to 6.0 dl/g, particularly preferably 0.35 to 5.0 dl/g.

The copolymer of the present invention may be a copolymer containing one or more kinds of addition polymerizable monomer in addition to ethylene and the vinyl compound (I). Examples of the addition polymerizable monomers include α-olefins having 3 to 20 carbon atoms or vinyl compounds other than the vinyl compound (I).

Specific examples of the α-olefins include straight-chain olefins such as propylene, 1-butene, 1-pentene, 1-hexene, 1-heptene, 1-octene, 1-nonene, and 1-decene; and branched-chain olefins such as 3-methyl-1-butene, 3-methyl-1-pentene, 4-methyl-1-pentene, and 5-methyl-1-hexene. A more preferable á-olefin is propylene, 1-butene, 1-pentene, 1-hexene, 1-heptene, 1-octene, or 4-methyl-1-pentene. Propylene, 1-butene or 1-hexene is particularly preferable.

Specific examples of other vinyl compounds include methyl vinyl ether, ethyl vinyl ether, acrylic acid, methyl acrylate, ethyl acrylate, methyl methacrylate, acrylonitrile, and vinyl acetate. One or more of them are preferably used.

The copolymer of the present invention can be prepared by, for example, copolymerizing ethylene and the vinyl compound (I) in the presence of a catalyst obtained by bringing isopropylidenebis(indenyl)zirconium dichloride and methylalumoxane into contact with each other. In this case, by appropriately varying the amounts of ethylene and the vinyl compound (I) to be introduced and the polymerization conditions such as polymerization temperature and polymerization time, it is possible to obtain copolymers having different copolymerization ratios of monomers, molecular weights or the like.

In the preparation method, use of some sorts of catalyst or some polymerization conditions may cause a homopolymer of ethylene or the vinyl compound (I) to be produced as a byproduct. In such a case, the copolymer of the present invention can be easily fractionated by performing solvent extraction using a Soxhlet's extractor or the like. Solvents to be used in such extraction can be appropriately selected depending on the sort of vinyl compound (I). For example, a homopolymer of the vinyl compound (I) such as polyvinylcyclohexane can be removed as an insoluble component in extraction using toluene and polyethylene can be removed as an insoluble component in extraction using chloroform. Thus, it is possible to fractionate the copolymer as a component that is soluble in both of the solvents.

Of course, the copolymer of the present invention may be used as it contains such a by-product unless there arises no problem in an intended application.

The copolymer of the present invention is suitably used for an adhesive, lens, memory medium, damping material, a molded article such as a film, sheet, pipe or container., and it is particularly suitable for an adhesive, lens, memory medium, and film.

Such a film, sheet, pipe or container can be obtained by a known molding method, for example, an inflation molding process comprising extruding a molten resin from a circular die and winding up a resulting film inflated like a tube, or a T-die extrusion molding process comprising extruding a molten resin from a linear die and winding up a resulting film or sheet, or other process such as calendering, blow molding, injection molding or profile extrusion molding.

The molded article according to the present invention is excellent in flexibility and viscoelasticity. The flexibility and viscoelasticity can be determined from a hysteresis curve obtained by subjecting the molded article to a tensile test.

The copolymer of the present invention may be combined with other material to form a multi-layered film, sheet or pipe having two ormore layers. The film, sheet or pipe can be produced by any one of various known lamination processes such as co-extrusion process, dry-lamination process, sandwich lamination process and extrusion lamination, and the like. Usable as other material are known materials such as paper, paperboard, aluminum thin film, cellophane, nylon, polyethylene terephthalate (PET), polypropylene, polyvinylidene chloride, ethylene-vinyl alcohol copolymer (EVOH), and various adhesive resins.

The copolymer may contain stabilizers such as phenol type stabilizers, phosphite type stabilizers, amine type stabilizers, amide type stabilizers, anti-aging agents, weathering agents, anti-precipitating agent, anti-oxidants, thermal stabilizers, light stabilizers; additives such as thixotropy controlling agents, puffing agent, antifoaming agents, surface controlling agents, pigment dispersants, antistatic agents, lubricants, nucleating agents, flame retardants, processing oil, dyestuff and the like; pigments such as a transition metal compound such as titanium oxide (rutile type), zinc oxide, carbon black and the like; and organic or inorganic fillers such as glass fiber, carbon fiber, potassium titanate fiber, wollastonite, calcium carbonate, calcium sulfate, talc, glass flakes, bariumsulfate, clay, fine powdery silica, mica, calcium silicate, aluminum hydroxide, magnesium hydroxide, magnesium oxide, alumina, celite and the like.

The molded article may be subjected to a known post-treatment such as corona discharge treatment, plasma treatment, ozone treatment, ultraviolet irradiation, electron beam irradiation or the like.

Further, the copolymer of the present invention can be applied to an adhesive containing the copolymer as an effective ingredient. The adhesive containing the copolymer as an effective ingredient exhibits an excellent adhesive property to various resins such as polyolefin resin.

The adhesive may contain a solvent such as water, an aromatic hydrocarbon(e.g. toluene, xylene), an aliphatic hydrocarbon(e.g. hexane), an ester (e.g. ethyl acetate, butyl acetate), a ketone(e.g. methyl ethyl ketone, methyl isobutyl ketone), an alcohol (e.g. methanol, isopropanol, ethylene glycol, propylene glycol), or the like. The content of the solvent in the adhesive is usually 150 to 3000 parts by weight, preferably 200 to 2000 parts by weight per 100 parts by weight of the copolymer. When the adhesive contains a solvent, the copolymer, a stabilizer, an additive, pigment, filler and the like may be dissolved or dispersed in the solvent.

As adherends, there are listed polyolefin resins and rubbers such as polypropylenes, polyethylenes (e.g. radical-polymerized low-density polyethylene, high-density polyethylene, linear low-density polyethylene), ethylene-propylene copolymers, ethyelene-propylene-diene copolymers, ethylene-vinyl alcohol copolymers (EVOH), styrene-butadiene-styrene block copolymers, and the like; polar group-containing thermoplastic resins such as polyesters (e.g. polyethylene terephthalate (PET)), polyvinyl chlorides, polyamide resins, (meth)acrylate resins, ethylene-(meth)acrylate resins, ethylene-vinyl acetate resins and the like; polar group-containing thermosetting resins such as epoxy resins, urethane resins, urea formaldehyde resins and the like; inorganic materials such as metals (e.g. aluminum plate, aluminum foil), glass, cement and the like; cellulose polymer materials such as paper, cellophane, paperboard, woods and the like.

A laminate can be obtained by adhrering the adhesive to the adherend. In the laminate, two kinds of adherends may be used.

In these adherends, polar group-containing thermoplastic resins and polyolefin resins are preferable, and polypropylenes are more preferable.

The adherend may contain a stabilizer, additive, pigment, filler, solvent and the like mentioned above.

Examples of the shape of the adherend may include a solution containing a pigment, solvent and the like in the polar group-containing thermoplastic resin or polar group-containing thermosetting resin; and film or sheet such as decorated film and the like; and the like. Among them, the solution-like adherend which contains the pigment, solvent and the like in the polar group-containing thermoplastic resin or polar group-containing thermosetting resin, can be used as a paint. There is preferred a film or sheet of a polyolefin resin or a hydrogenation product obtained by hydrogenating olefin bonds of the backbone of the polyolefin resin such as a styrene-butadiene-styrene block copolymer. As the paint, two or more kinds of the polar group-containing thermoplastic resins or polar group-containing thermosetting resins may be mixed and used, further at least one kind of paints may be applied two or more times.

Examples of the producing method of the laminate include, for example, a method comprising piling an adherend, the adhesive (the copolymer) and an adherend, and hot-pressing them; a method comprising applying a solution-like adhesive on a adherend, drying the resultant, and laminating another adherend; a method comprising applying a solution-like adhesive on an adherend, and then a solution-like adherend thereon, and heating them to adhere and laminate them; and a method comprising co-extruding an adherend, the copolymer and an adherend to prepare a laminate. Further, a dry-lamination process, sandwich lamination process or the like can be also applied.

The present invention will be described in more detail by way of Examples and Comparative Examples. However, the present invention is not limited thereto.

The properties of each copolymer in the Examples were determined by the following methods.
(1) The intrinsic viscosity [η] was measured at 135° C. with an Ubbelohde viscometer using tetralin as a solvent.
(2) The glass transition point was measured using a DSC (SSC-5200 manufactured by SEIKO INSTRUMENT CO.) under the following conditions and was determined from its inflection point.

Heating: from 20° C. to 200° C. (20° C./min), kept for 10 min.
Cooling: from 200° C. to −50° C. (20° C./min), kept for 10 min.
Measurement: from −50° C. to 300° C. (20° C./min)
(3) The molecular weight and the molecular weight distribution were determined using the following two types of gel permeation chromatograph. It is to be noted that the molecular weight distribution was evaluated as a ratio of weight average molecular weight to number-average molecular weight.

EXAMPLES 1 AND 2

Type: 150-CV manufactured by Waters
Column: Shodex 806M/S
Temperature for the measurement: 145° C.
Solvent for the measurement: orthodichlorobenzene
Concentration for the measurement: 1 mg/ml

EXAMPLE 3

Type: 800 series manufactured by NIPPON BUNKO CO.
Column: Shodex A806M
Temperature for the measurement: 45° C.
Solvent for the measurement: tetrahydrofuran
Concentration for the measurement: 0.5 mg/ml

EXAMPLES 6–8 AND COMPARATIVE EXAMPLES 1 AND 2

Type: 150-C manufactured by Waters
Column: Shodex A-80M
Temperature for the measurement: 140° C.
Solvent for the measurement: orthodichlorobenzene
Concentration for the measurement: 1 mg/ml
(4) The content of a vinylcyclohexane unit in a copolymer and the structure of the copolymer were determined by $^{13}$C-NMR analysis.
  $^{13}$C-NMR apparatus: DRX600 manufactured by BRUKER CO.
  Solvent for the measurement: mixture of orthodichlorobenzene and orthodichlorobenzene-d4 at a ratio of 4:1 (volume ratio) Temperature for the measurement: 135° C.
(5) The hysteresis curve of the polymer was determined using STROGRAPH-T(manufactured by Toyo Seiki Seisakusho, Ltd.) under the following conditions:
  Test piece: pressed sheet of 0.3 mm in thickness and 3 mm in width Rate of tensile: 50 mm/min
Tensile magnification: 2 times
Distance between chucks: 35 mm
(6) The solid viscoelasticity was determined using EXSTAR-6000 (manufactured by Seiko Instruments Co., Ltd.) under the following conditions:
Test piece: Pressed sheet of 20 mm×8 mm×0.3 mm in size
Frequency: 5 Hz
Heating rate: 3° C./minute
Displacement amplitude: 5 μm
(7) The refractive index of the polymer was determined with ABBE REFRACTOMETER Type 3 (manufactured by ATAGO Co., Ltd.) using a test piece cut to a size of 10 mm×30 mm out of a 100 im-thick film formed by pre-heating the polymer at 150° C. for three minutes and then hot-pressing it under a pressure of 3 to 5 MPa at 150° C. for three minutes.

EXAMPLE 1

Into a 5000 ml-autoclave having an atmosphere replaced with argon were introduced 220 g of vinylcyclohexane and 1480 g of dehydrated toluene. After heating to 40° C., ethylene was charged therein to 0.8 MPa. Further, 8.9 ml of a solution of methylalumoxane in toluene [MMAO produced by Tosoh Akzo Corp., Al atom converted concentration=6 wt %] and a previously prepared mixture of a solution (actually in a suspended state) of 17.3 mg of isopropylidenebis(indenyl)zirconium dichloride dissolved in 8.7 ml of dehydrated toluene and 2.2 ml of the foregoing toluene solution of methylalumoxane were charged. The reaction liquid was stirred for one hour and then poured into 6000 ml of methanol, and a precipitated white solid was collected through filtration. The solid was washed with methanol and then dried under reduced pressure, to obtain 254 g of a polymer.

The polymer was subjected to purification by solvent fractionation. 4.05 g of the polymer was subjected to Soxhlet extraction with toluene for 10 hours, to obtain 4.01 g of a polymer as a component that was soluble in toluene. Further, 2.73 g of the toluene-soluble polymer thus obtained was subjected to Soxhlet extraction with chloroform for 10 hours, to obtain 2.56 g of a polymer as a component that was soluble in chloroform. The polymer that was soluble in both of toluene and chloroform had an intrinsic viscosity [η] of 0.72 dl/g, refractive index of 1.504, number average molecular weight of 54,000, molecular weight distribution of 1.9, glass transition point of −24° C., and vinylcyclohexane unit content of 23 mol %.

The $^{13}$C-NMR spectrum of the polymer thus obtained is shown in FIG. 1. The polymer was confirmed to have a structure in which carbon atoms substituted with vinylcyclohexyl groups were separated from each other by one methylene group.

Figure 11:
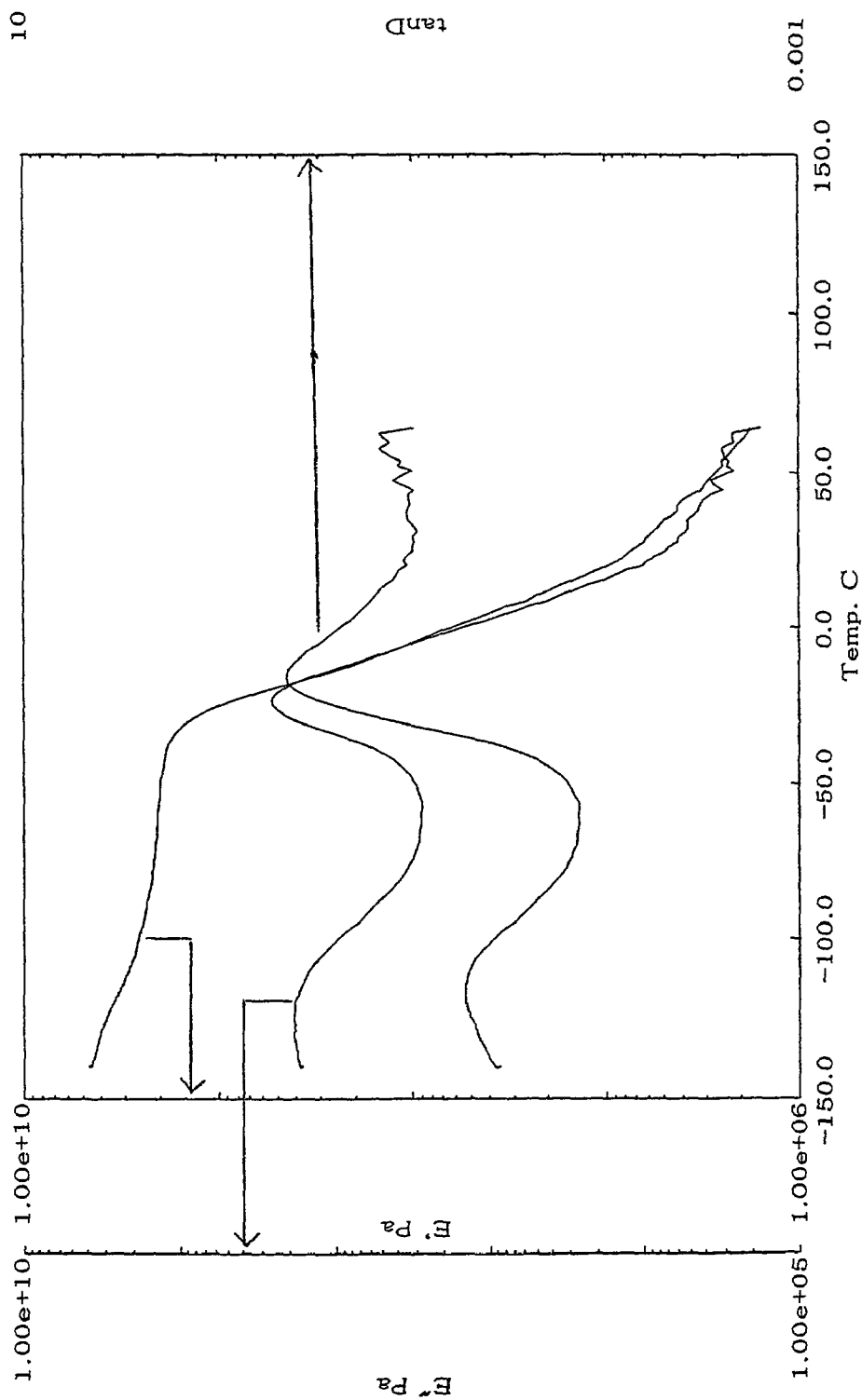
FIG. 11 is measurement data of a solid viscoelasticity of the polymer obtained in Example 1.

A pressed sheet formed of the polymer had very high transparency and was excellent in flexibility and elastic recoverability. The solid viscoelasticity of the obtained polymer is shown in FIG. 11.

EXAMPLE 2

Into a 400 ml-autoclave having an atmosphere replaced with argon were introduced 102.7 ml of vinylcyclohexane and 43.5 ml of dehydrated toluene. After heating to 30° C., ethylene was charged to 0.8 MPa. Further, 2.8 ml of a solution of methylalumoxane in toluene [MMAO produced by Tosoh Akzo Corp., Al atom converted concentration=6 wt %] was charged and then a solution (actually in a suspended state) of 1.1 mg of isopropylidenebis(indenyl) zirconium dichloride in 1.1 ml of dehydrated toluene was charged. The reaction liquid was stirred for one hour and then poured into 500 ml of methanol, and a precipitated white solid was collected through filtration. The solid was washed with methanol and then dried under reduced pressure, to obtain 18.6 g of a polymer.

The polymer was subjected to purification by solvent fractionation. 8.34 g of the polymer was subjected to Soxhlet extraction with chloroform for 10 hours, to obtain 7.97 g of a polymer as a component that was soluble in chloroform. The chloroform-soluble polymer had an intrinsic viscosity [η] of 0.35 dl/g, refractive index of 1.511, number average molecular weight of 27,000, molecular weight distribution of 1.8, glass transition point of 7° C., and vinylcyclohexane unit content in the polymer of 37 mol %.

Figure 2:
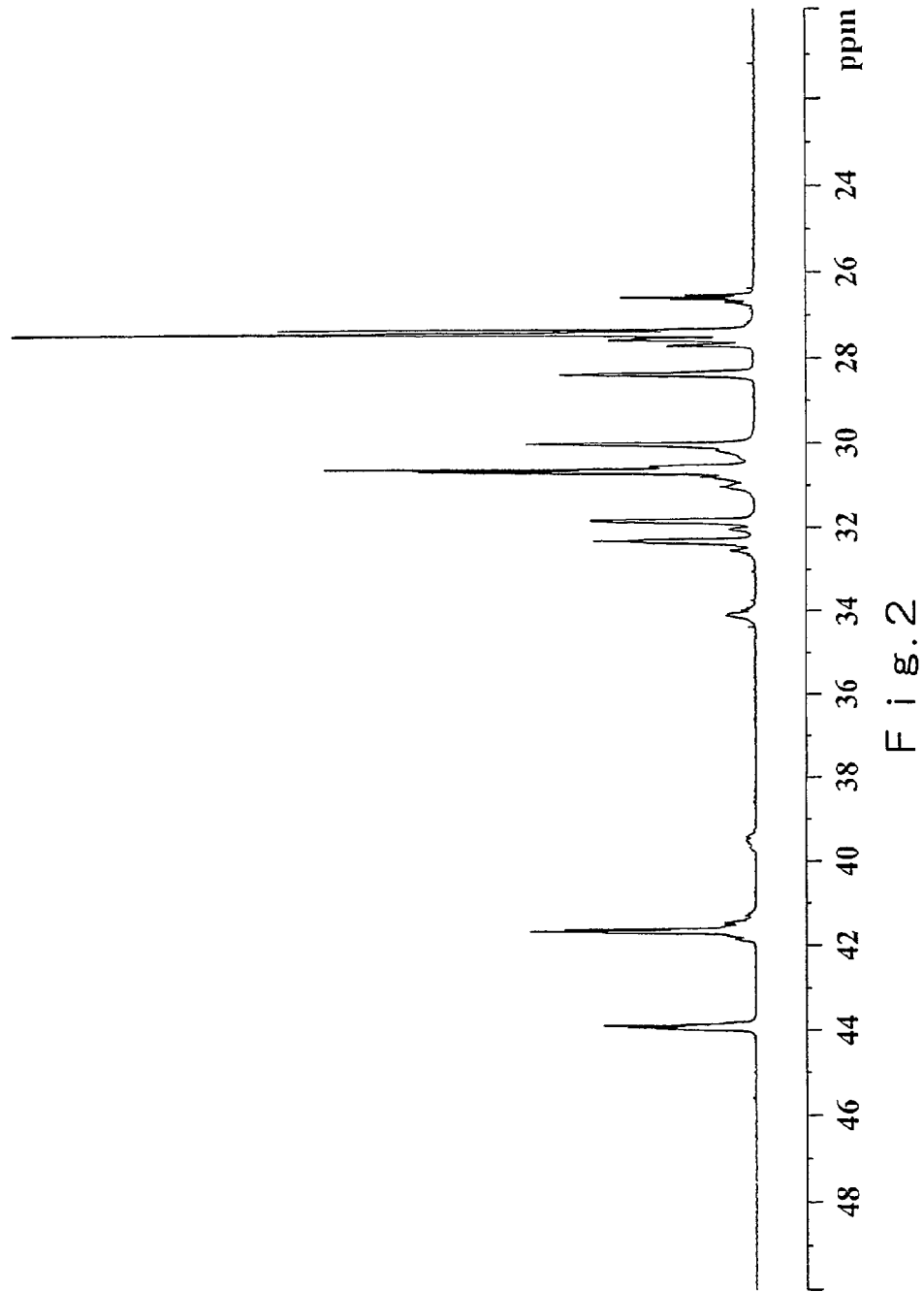
FIG. 2 is a $^{13}C$-NMR spectrum of the polymer obtained in Example 2.
Figure 12:
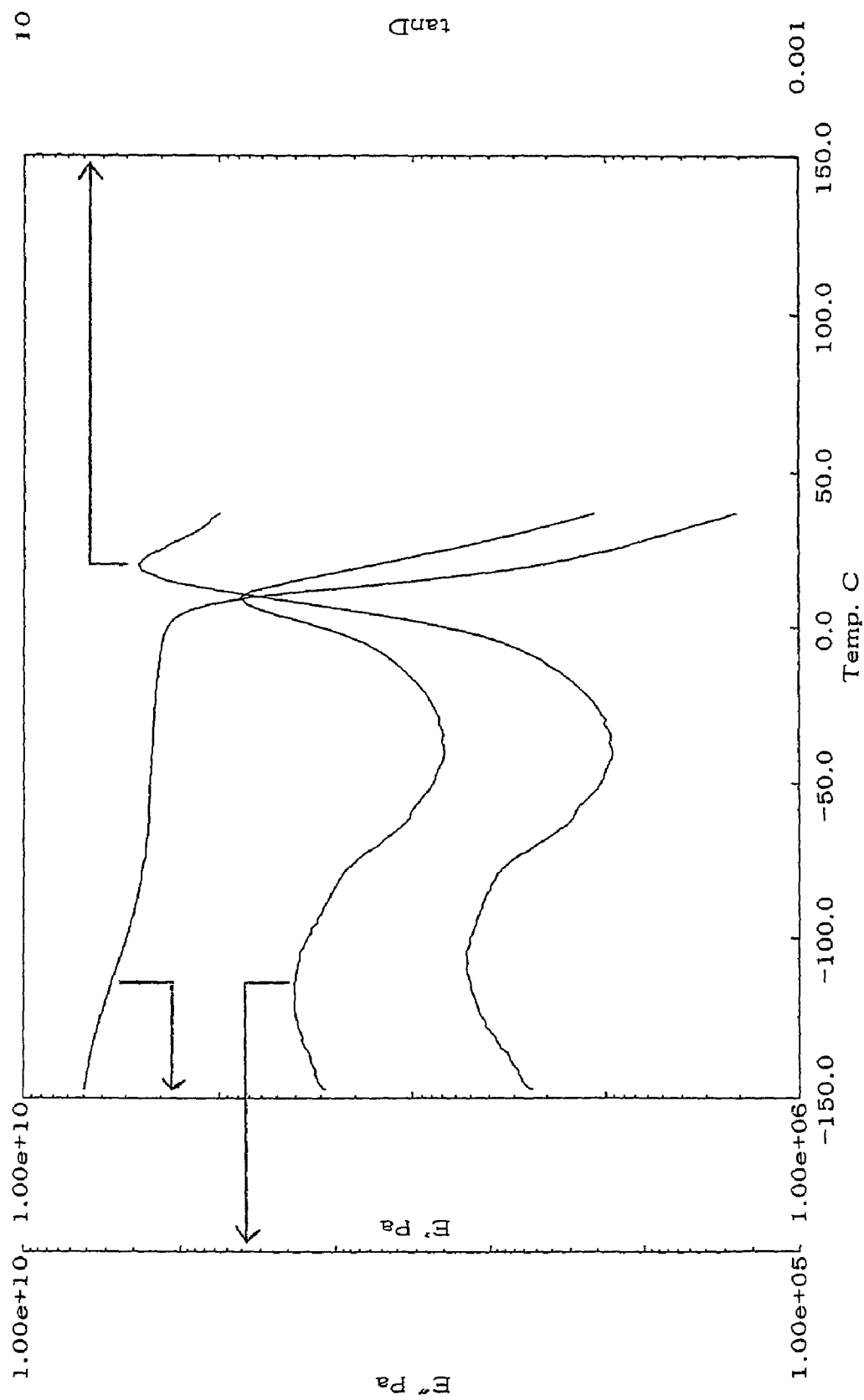
FIG. 12 is measurement data of a solid viscoelasticity of the polymer obtained in Example 2.
Figure 15:
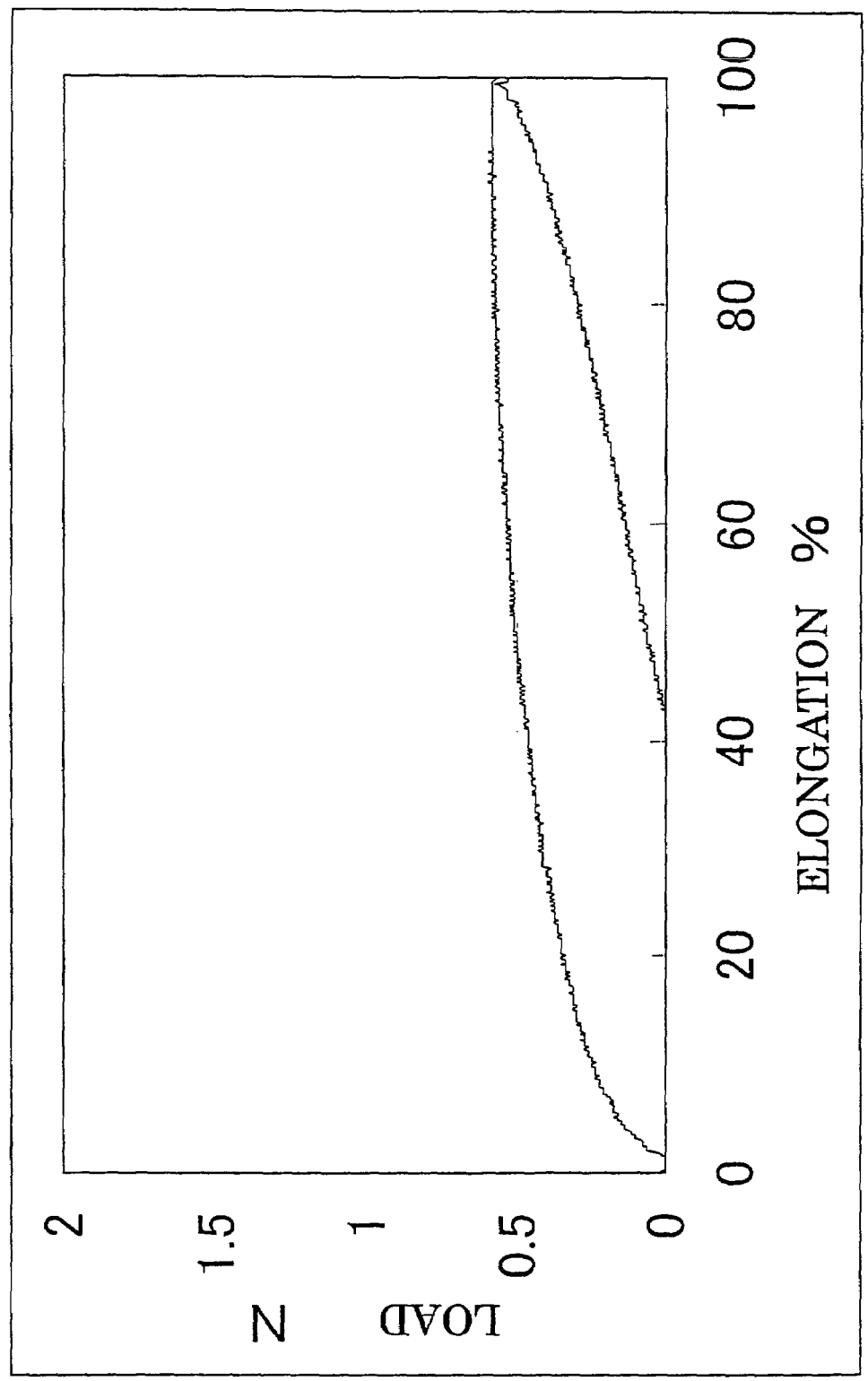
FIG. 15 is a hysteresis curve of the polymer obtained in Example 2.

The $^{13}$C-NMR spectrum of the polymer thus obtained is shown in FIG. 2. The polymer was confirmed to have a structure in which carbon atoms substituted with vinylcyclohexyl groups were separated from each other by one methylene group. The solid viscoelasticity of the obtained polymer is shown in FIG. 12. The hysteresis curve of the polymer is shown in FIG. 15. A pressed sheet formed of the polymer had very high transparency and was excellent in flexibility and elastic recoverability.

EXAMPLE 3

The same operation as in Example 2 except that the amount of charged ethylene in Example 2 was changed from 0.8 MPa to 0.2 MPa was carried out to give 38.9 g of a polymer. The polymer was subjected to purification by solvent fractionation. 2.01 g of the polymer was subjected to Soxhlet extraction with toluene for 10 hours, to give 1.99 g of a polymer as a component that was soluble in toluene. When 1.23 g of the toluene-soluble polymer thus obtained was further subjected to Soxhlet extraction with chloroform (for 10 hours), substantially the whole amount of the polymer could be recovered as a chloroform-soluble component. The polymer thus recovered had an intrinsic viscosity [η] of 0.39 dl/g, refractive index of 1.512, number average molecular weight of 39,000, molecular weight distribution of 2.0, glass transition point of 81° C., and vinylcyclohexane unit content in the polymer of 71 mol %.

Figure 3:
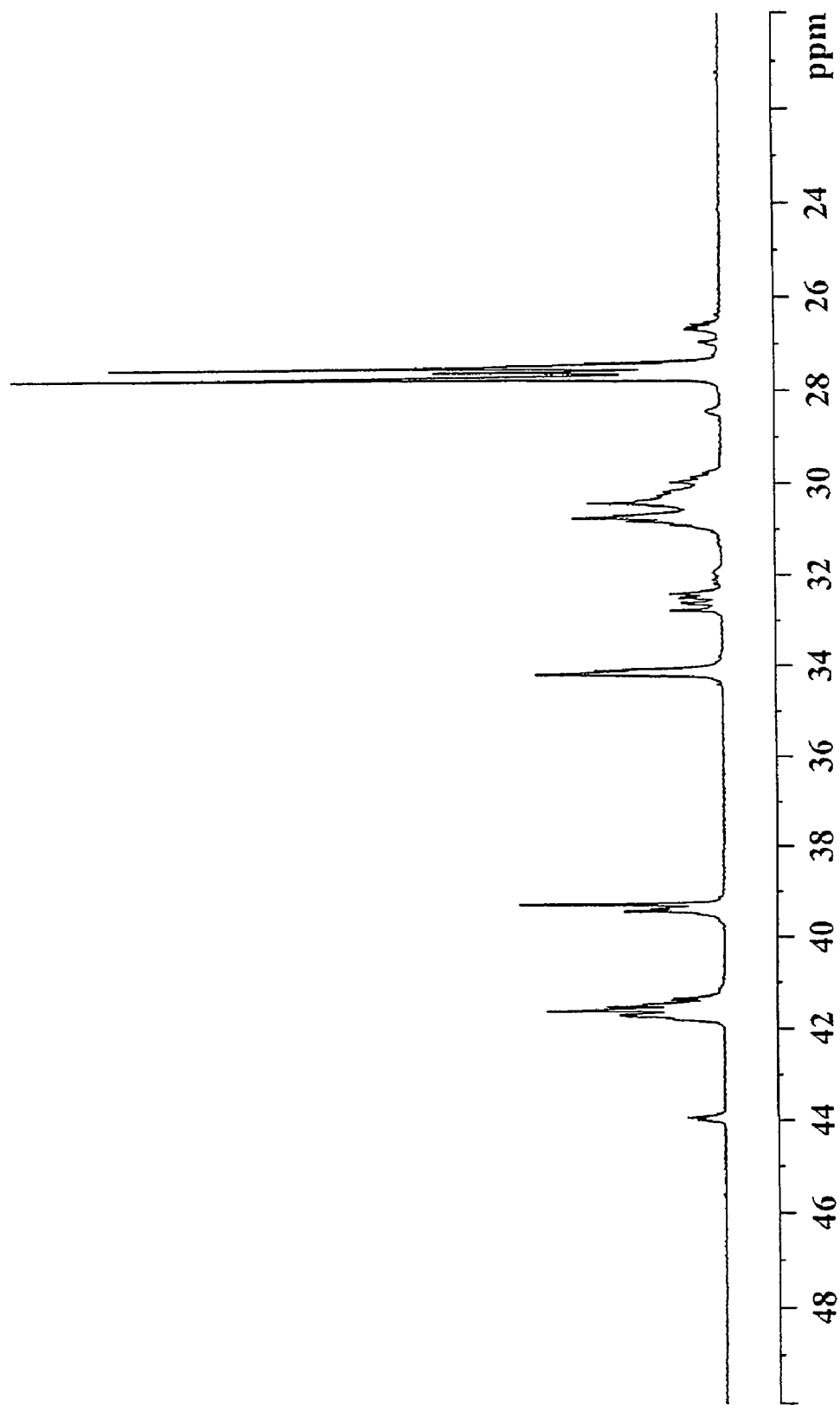
FIG. 3 is a $^{13}C$-NMR spectrum of the polymer obtained in Example 3.

The $^{13}$C-NMR spectrum of the polymer thus obtained is shown in FIG. 3. The polymer was confirmed to have a structure in which carbon atoms substituted with vinylcyclohexyl groups were separated from each other by one methylene group. A pressed sheet formed of the polymer had very high transparency.

Figure 13:
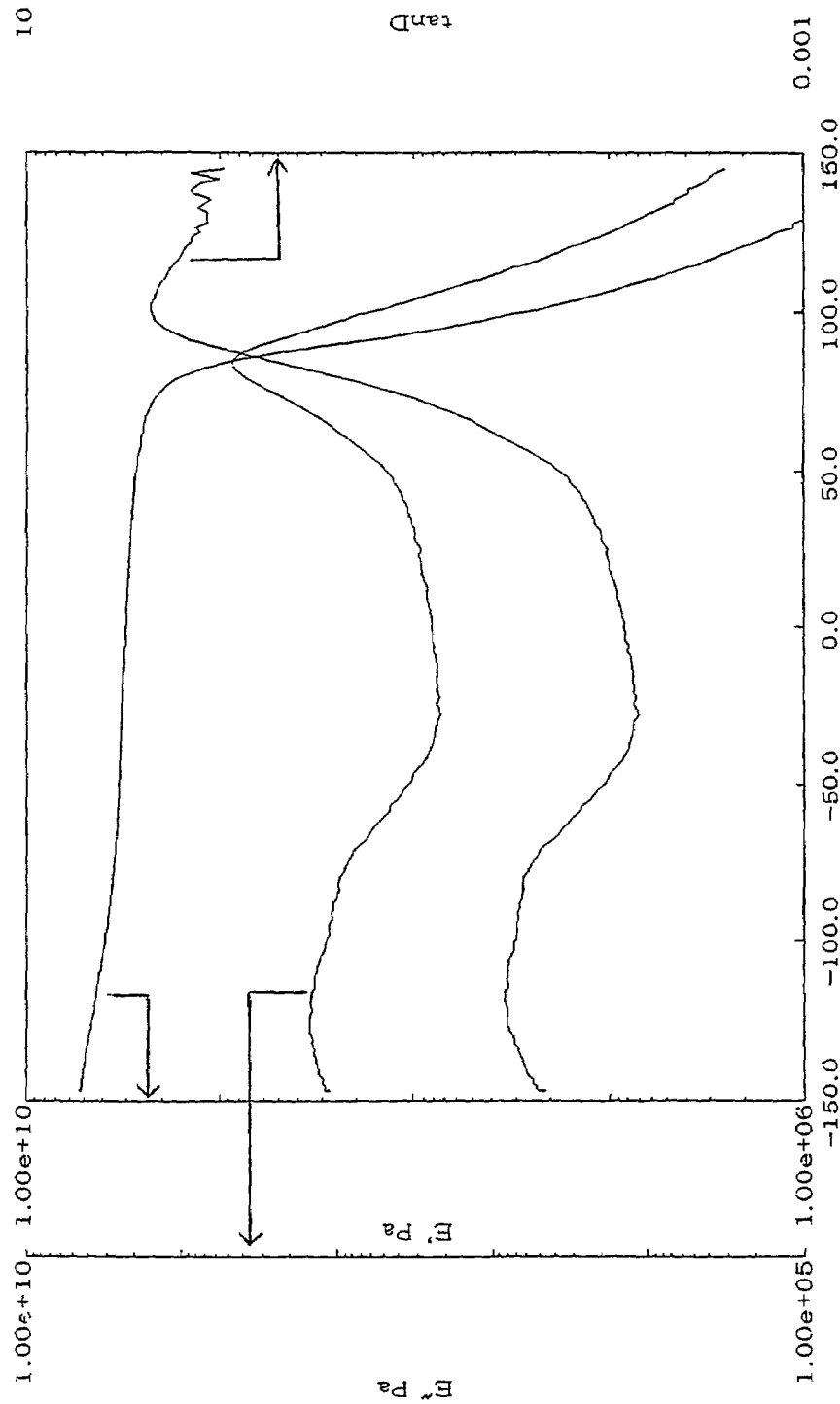
FIG. 13 is measurement data of a solid viscoelasticity of the polymer obtained in Example 3.

The solid viscoelasticity of the obtained polymer is shown in FIG. 13.

EXAMPLE 4

The same operation as in Example 2 except that the amount of charged ethylene in Example 2 was changed from 0.8 MPa to 0.6 MPa was carried out to give 7.78 g of a polymer. The polymer was subjected to purification by solvent fractionation. 7.29 g of the polymer was subjected to Soxhlet extraction with toluene for 10 hours, to give 6.55 g of a polymer as a component that was soluble in chloroform. The polymer thus recovered had an intrinsic viscosity [η] of 0.36 dl/g, glass transition point of 23° C., and vinylcyclohexane unit content in the polymer of 44 mol %.

Figure 4:
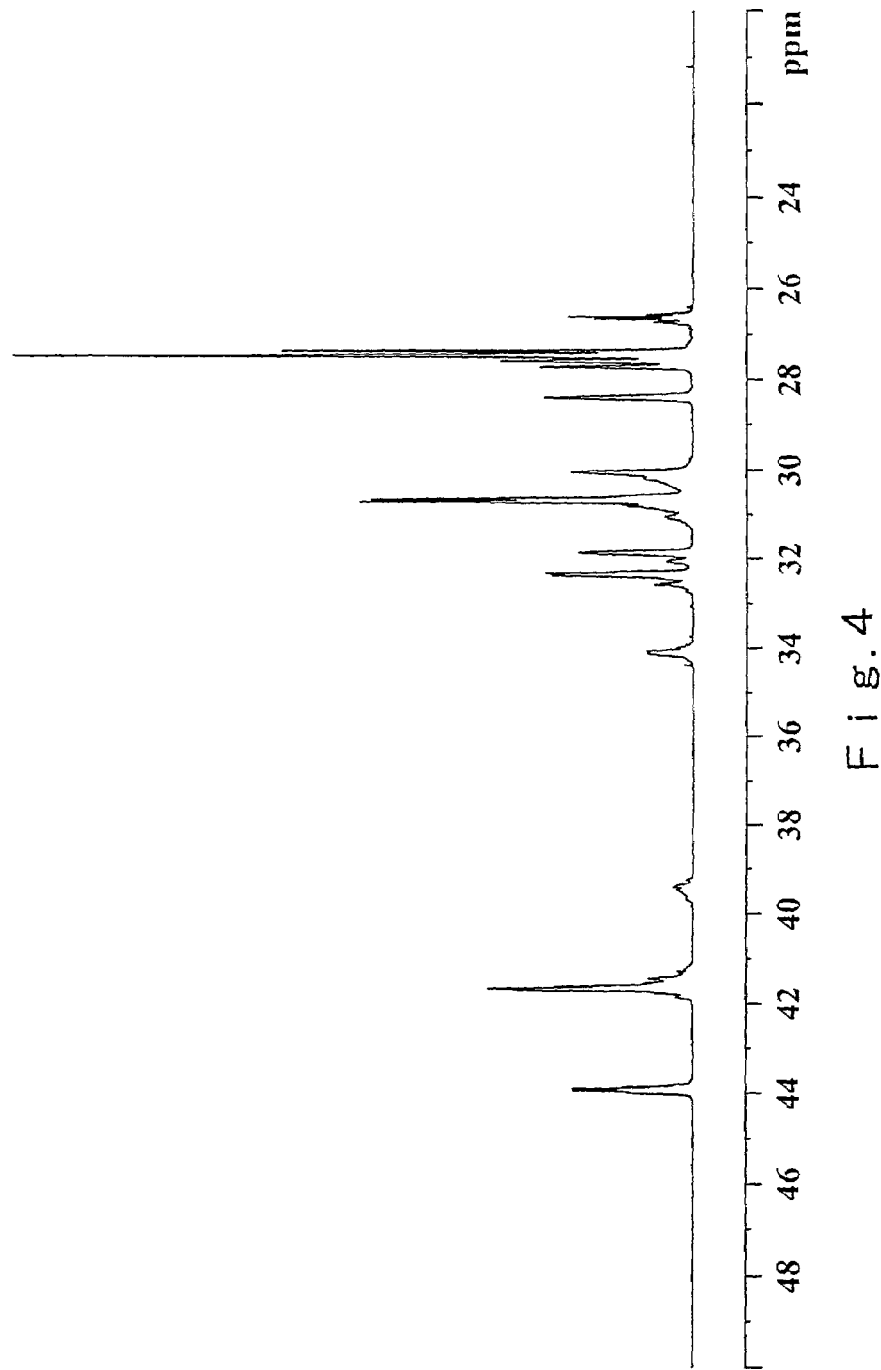
FIG. 4 is a $^{13}C$-NMR spectrum of the polymer obtained in Example 4.

The $^{13}$C-NMR spectrum of the polymer thus obtained is shown in FIG. 4. The polymer was confirmed to have a structure in which carbon atoms substituted with vinylcyclohexyl groups were separated from each other by one methylene group.

Figure 14:
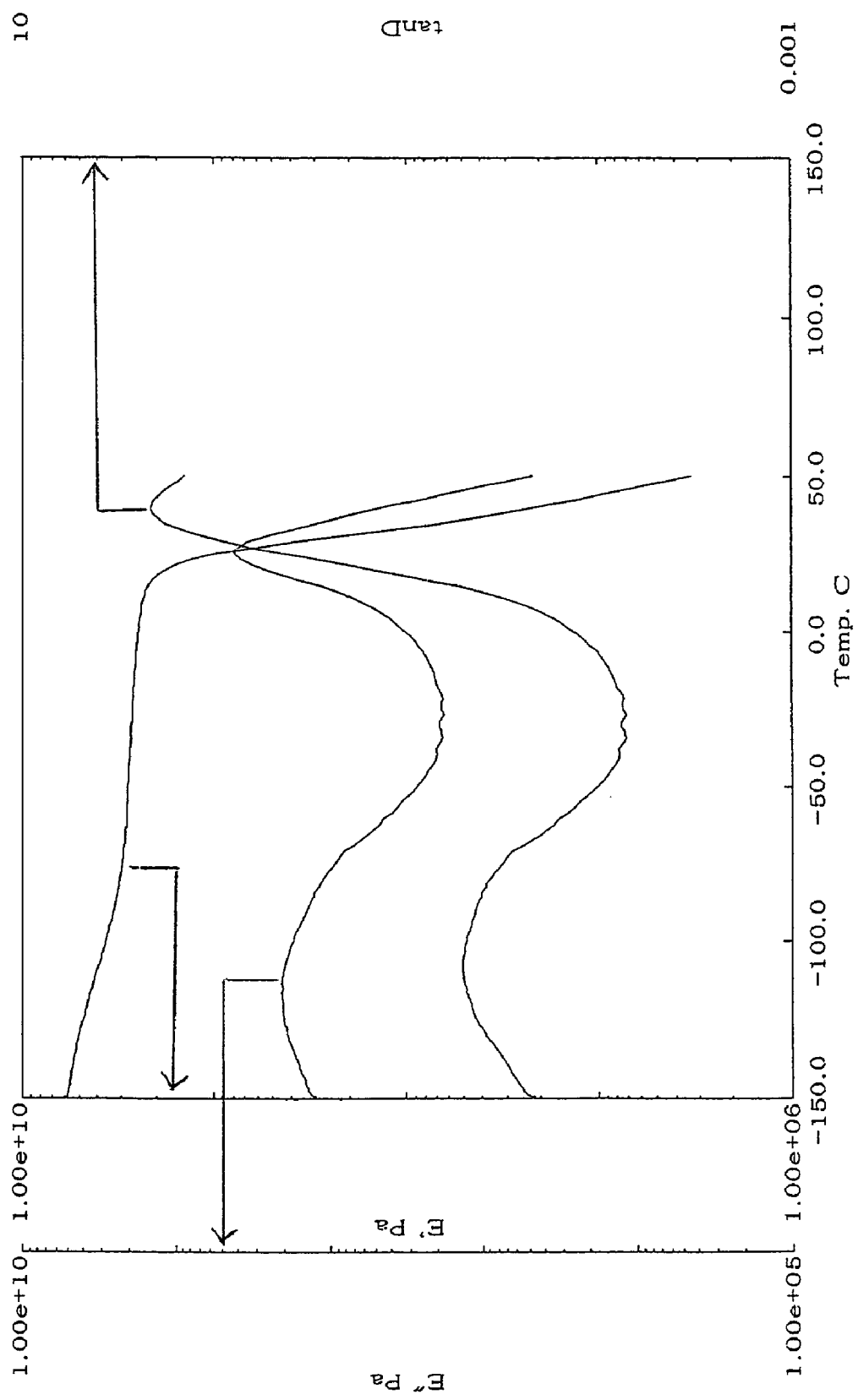
FIG. 14 is measurement data of a solid viscoelasticity of the polymer obtained in Example 4.
Figure 16:
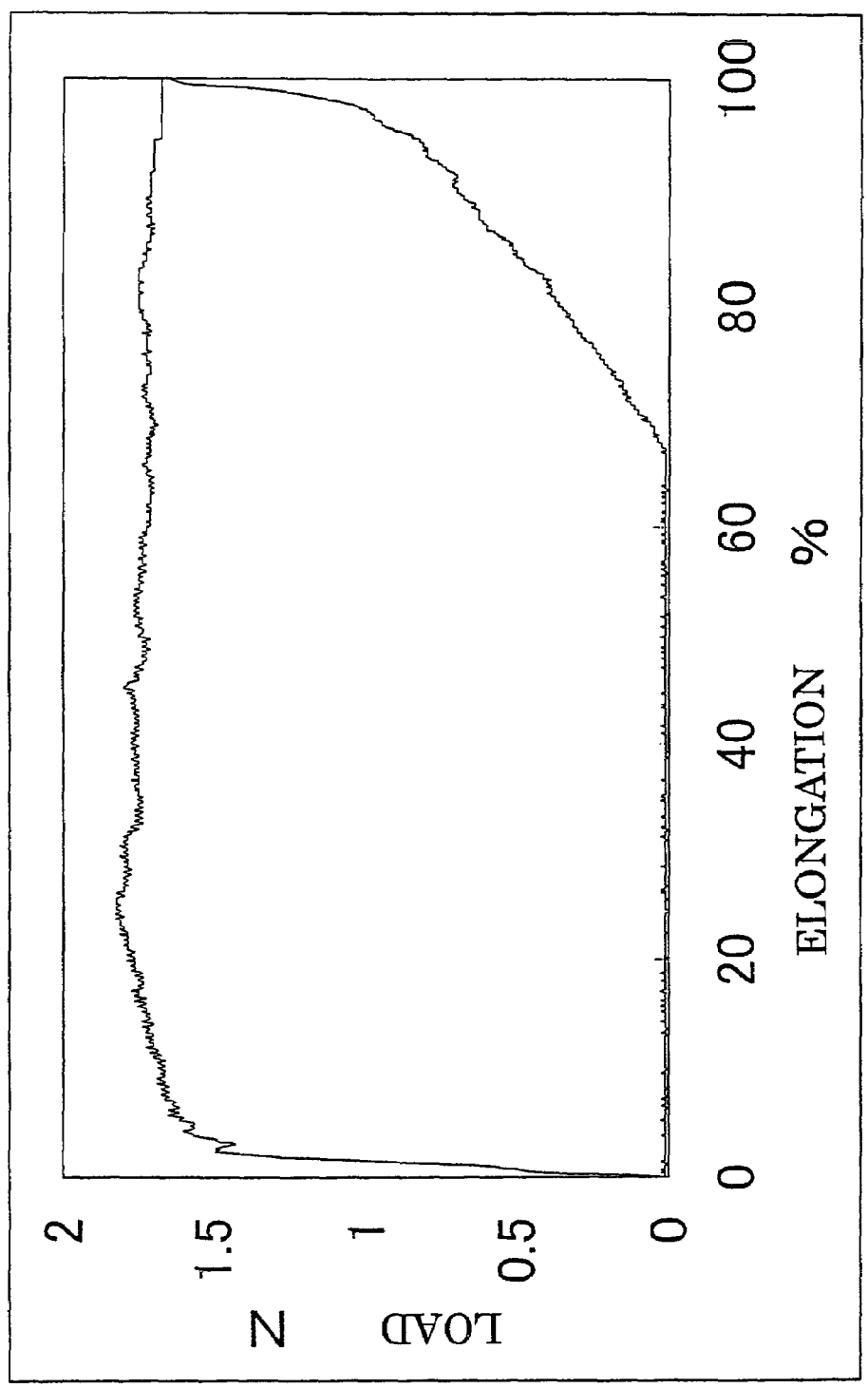
FIG. 16 is a hysteresis curve of the polymer obtained in Example 4.

The solid viscoelasticity of the obtained polymer is shown in FIG. 14. The hysteresis curve of the polymer is shown in FIG. 16. A pressed sheet formed of the polymer had very high transparency and was excellent in flexibility and elastic recoverability.

EXAMPLE 5

The same operation as in Example 2 was carried out except that the amount of charged vinylcyclohexane in Example 2 was changed from 102.7 ml to 22 ml, the amount of dehydrated toluene was changed from 43.5 ml to 174 ml, the polymerization temperature was changed from 35° C. to 50° C., the amount of the toluene solution of methylalumoxane [MMAO manufactured by Tosoh-Akzo Co, Ltd, Al converted concentration of 6 wt %] was changed from 2.8 ml to 2.4 ml, and the solution in which 1.1 mg of isopropylidenebis(indenyl)zirconium chloride was dissolved in 1.1 ml of dehydrated toluene was changed to a solution in which 0.9 ml of isopropylidenebis (indenyl) zirconium chloride was dissolved in 1.7 ml of dehydrated toluene, to give 29.5 g of a polymer. The polymer thus obtained had an intrinsic viscosity [η] of 0.64 dl/g, glass transition point of −20° C., melting point of 56° C. and vinylcyclohexane unit content in the polymer of 16 mol %.

Figure 5:
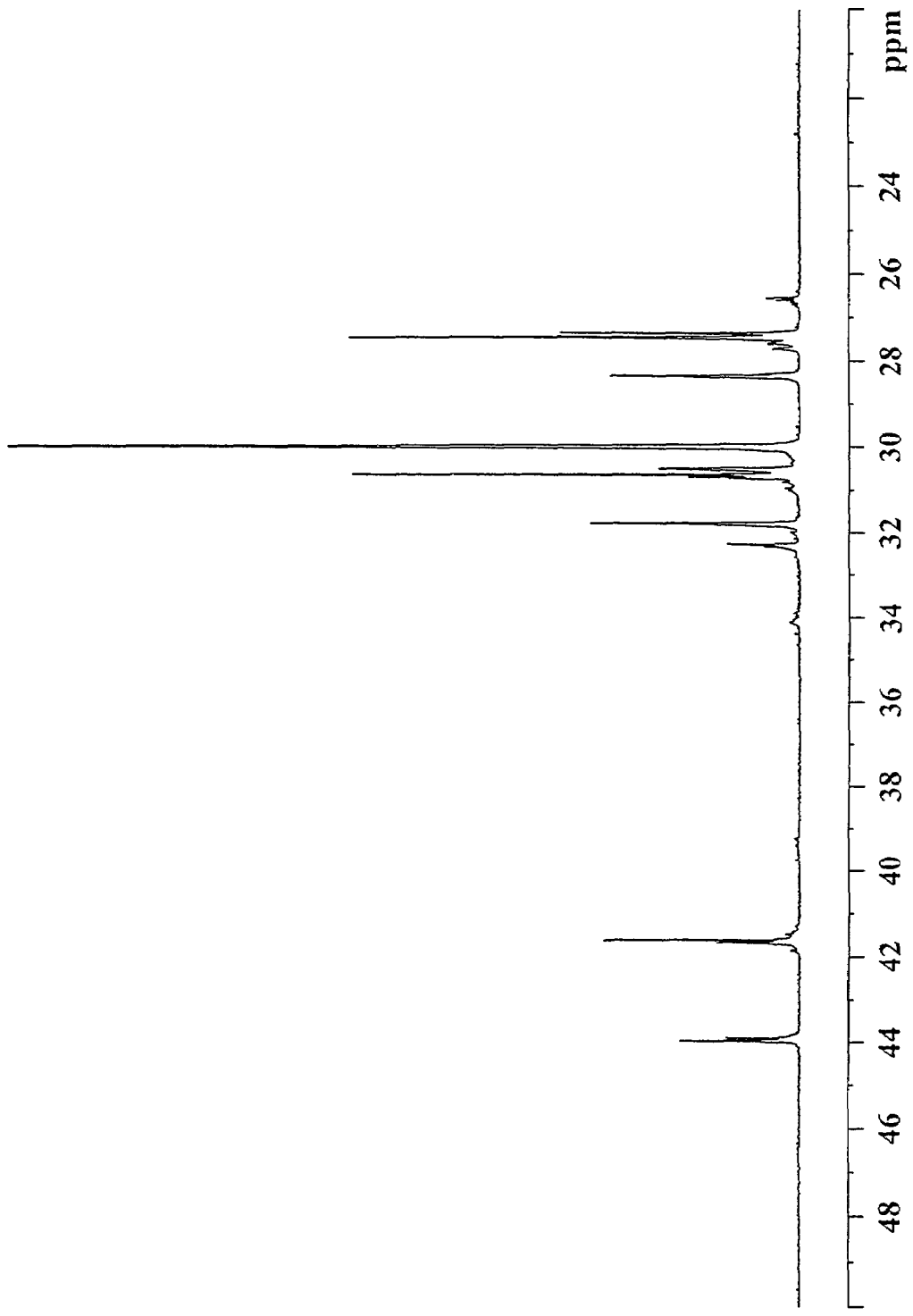
FIG. 5 is a $^{13}C$-NMR spectrum of the polymer obtained in Example 5.

The $^{13}$C-NMR spectrum of the polymer thus obtained is shown in FIG. 5. The polymer was confirmed to have a structure in which carbon atoms substituted with vinylcyclohexyl groups were separated from each other by one methylene group.

A pressed sheet formed of the polymer had very high transparency and was excellent in flexibility and elastic recoverability.

EXAMPLE 6

The same operation as in Example 1 was carried out except that the amount of charged vinylcyclohexane in Example 1 was changed from 220 g to 440 g, the amount of dehydrated toluene was changed from 1480 g to 1233 g, the solution in which 17.3 mg of isopropylidenebis(indenyl) zirconium chloride was dissolved in 8.7 ml of dehydrated toluene was changed to a solution in which 8.7 mg of isopropylidenebis(indenyl)zirconium chloride was dissolved in 8.7 ml of dehydrated toluene, and the reaction time was changed from 1 hour to 2 hours, to give 133.9 gof apolymer. The polymer thus obtained had an intrinsic viscosity [η] of 0.66 dl/g, number average molecular weight of 47,000, molecular weight distribution(Mw/Mn) of 2.1, glass transition point of −25° C., and vinylcyclohexane unit content in the polymer of 25 mol %.

Figure 6:
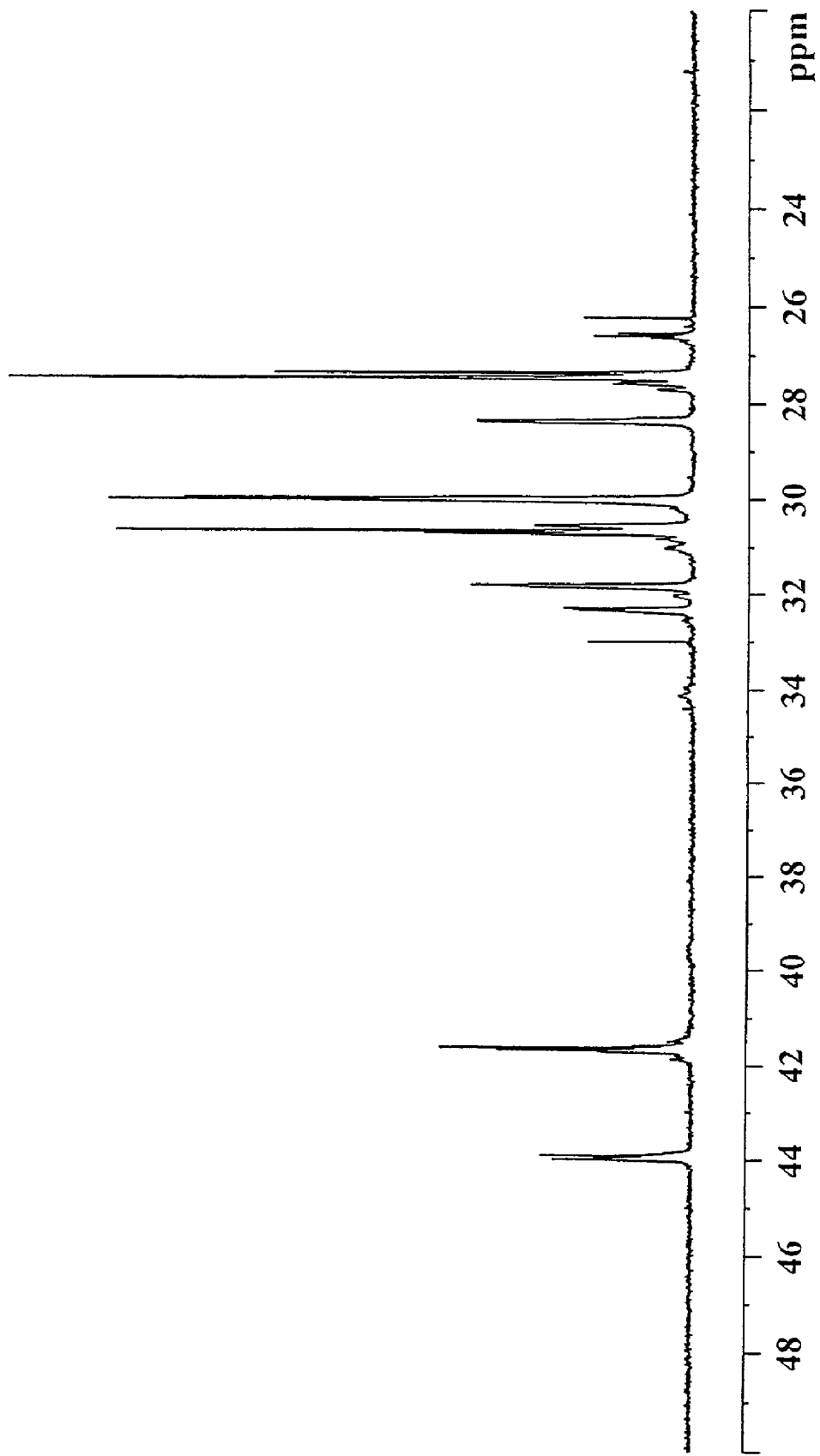
FIG. 6 is a $^{13}C$-NMR spectrum of the polymer obtained in Example 6.

The $^{13}$C-NMR spectrum of the polymer thus obtained is shown in FIG. 6. The polymer was confirmed to have a structure in which carbon atoms substituted with vinylcyclohexyl groups were separated from each other by one methylene group.

A pressed sheet formed of the polymer had very high transparency and was excellent in flexibility and elastic recoverability.

EXAMPLE 7

The same operation as in Example 1 was carried out except that the amount of charged vinylcyclohexane in Example 1 was changed from 220 g to 1102 g, the amount of dehydrated toluene was changed from 1480 g to 519 g, the solution in which 17.3 mg of isopropylidenebis(indenyl) zirconium chloride was dissolved in 8.7 ml of dehydrated toluene was changed to a solution in which 8.7 mg of isopropylidenebis(indenyl) zirconium chloride was dissolved in 8.7 ml of dehydrated toluene, the polymerization temperature was changed from 40° C. to 30° C., and the reaction time was changed from 1 hour to 2 hours and 30 minutes, to give 236.2 g of a polymer. The polymer thus obtained had a number average molecular weight of 31,000, molecular weight distribution(Mw/Mn) of 2.4, glass transition point of 1° C., and vinylcyclohexane unit content in the polymer of 34 mol %.

Figure 7:
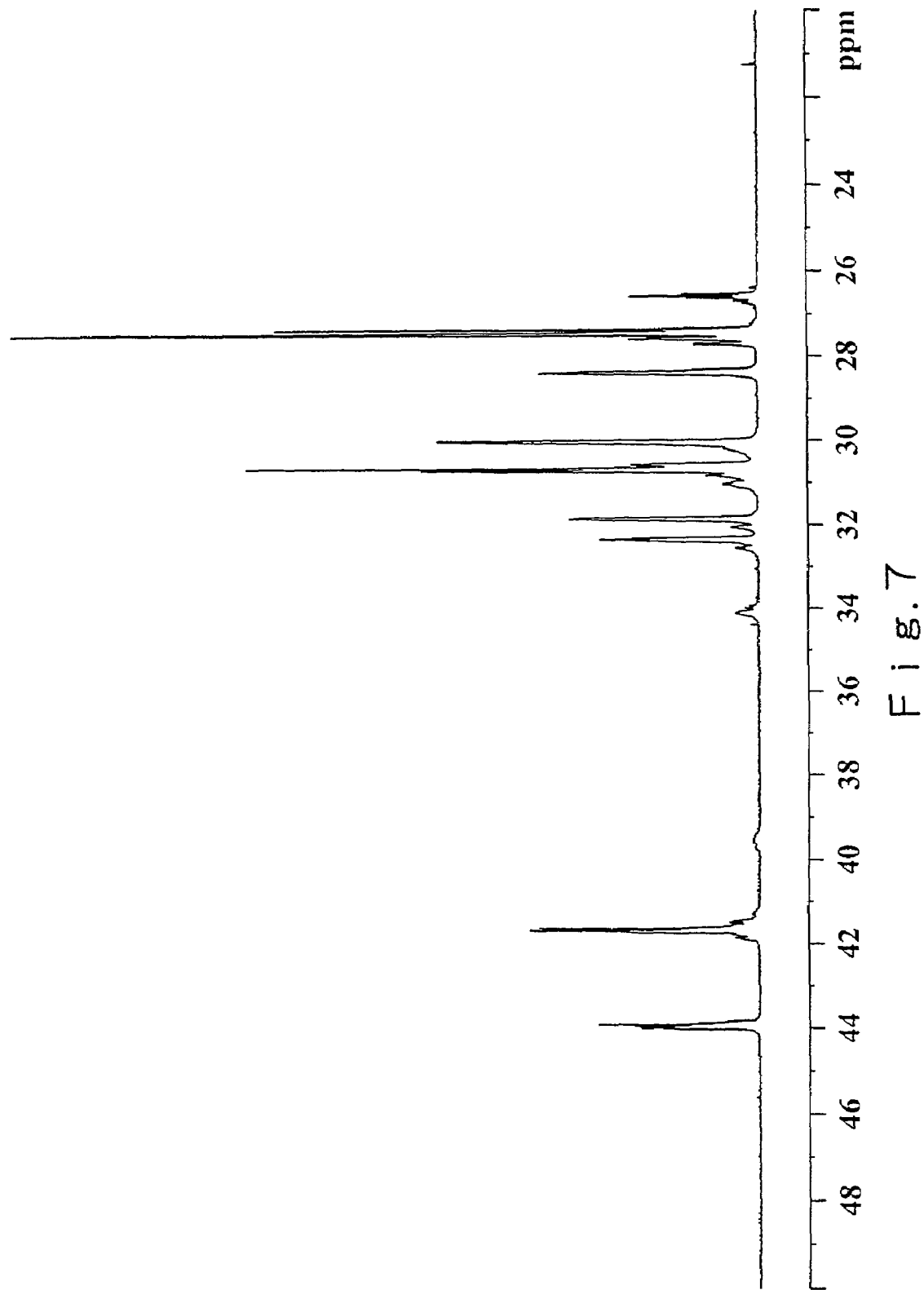
FIG. 7 is a $^{13}C$-NMR spectrum of the polymer obtained in Example 7.

The $^{13}$C-NMR spectrum of the polymer thus obtained is shown in FIG. 7. The polymer was confirmed to have a structure in which carbon atoms substituted with vinylcyclohexyl groups were separated from each other by one methylene group.

A pressed sheet formed of the polymer had very high transparency and was excellent in flexibility and elastic recoverability.

EXAMPLE 8

The same operation as in Example 1 was carried out except that the amount of charged vinylcyclohexane in Example 1 was changed from 220 g to 1102 g, the amount of dehydrated toluene was changed from 1480 g to 514 g, the amount of charged ethylene was changed from 0.8 MPa to 0.4 MPa, the amount of the solution of methylalumoxane in toluene [MMAO produced by Tosoh Akzo Corp., Al atom converted concentration=6 wt %] was changed from 8.9 ml to 11.1 ml, the mixture obtained by previously mixing the solution of 17.3 mg of isopropylidenebis(indenyl)zirconium dichloride dissolved in 8.7 ml of dehydrated toluene with 2.2 ml of the above solution of methylalumoxane in toluene was changed to a mixture obtained by previously mixing a solution of 21.6 mg of isopropylidenebis(indenyl)zirconium dichloride dissolved in 10.8 ml of dehydrated toluene with 2.8 ml of the above solution of methylalumoxane in toluene, and the reaction time was changed from 1 hour to 1 hour and 40 minutes, to give 850 g of a polymer. The polymer thus obtained had a number average molecular weight of 22,000, molecular weight distribution(Mw/Mn) of 4.2, glass transition point of 52° C., and vinylcyclohexane unit content in the polymer of 53 mol %.

Figure 8:
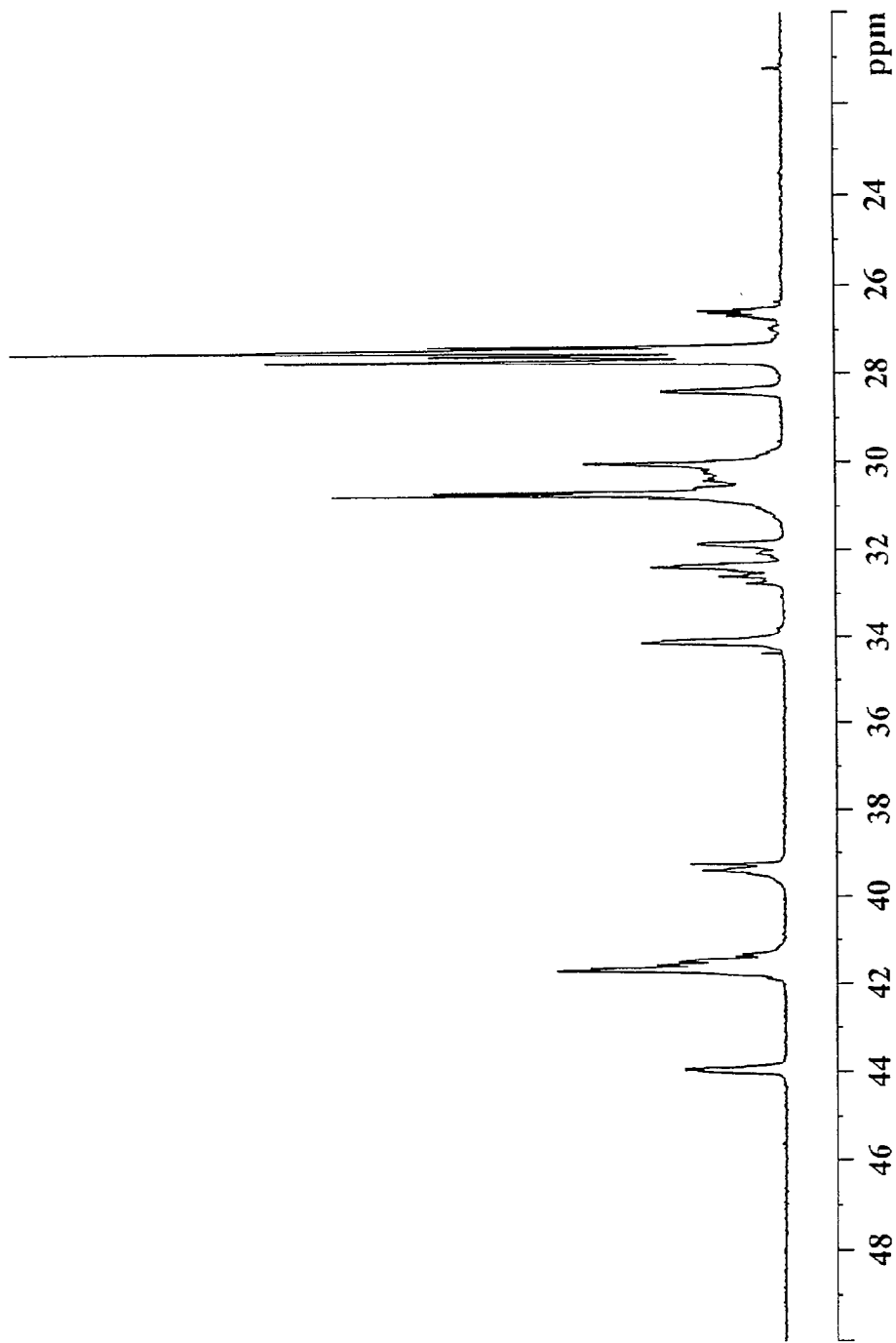
FIG. 8 is a $^{13}C$-NMR spectrum of the polymer obtained in Example 8.

The $^{13}$C-NMR spectrum of the polymer thus obtained is shown in FIG. 8. The polymer was confirmed to have a structure in which carbon atoms substituted with vinylcyclohexyl groups were separated from each other by one methylene group.

A pressed sheet formed of the polymer had very high transparency and was excellent in flexibility and elastic recoverability.

EXAMPLE 9

Into a 400 ml-autoclave having an atmosphere replaced with argon were introduced 10.5 g of 3-methyl-1-butene and 130 ml of dehydrated toluene. After heating to 50° C., ethylene was charged therein to 0.8 MPa. Further, 2.4 ml of a solution of methylalumoxane in toluene [MMAO produced by Tosoh Akzo Corp., Al atom converted concentration=6 wt %] and successively, a solution of 0.4 mg of isopropylidenebis(indenyl)zirconium dichloride dissolved in 0.9 ml of dehydrated toluene. The reaction liquid was stirred for one hour and then poured into 500 ml of methanol, and a precipitated white solid was collected through filtration. The solid was washed with methanol and then dried under reduced pressure, to obtain 14.15 g of a polymer.

The polymer had an intrinsic viscosity [η] of 1.02 dl/g, melting point of 109° C., and 3-methyl-1-butene unit content of 3.0 mol %.

Figure 9:
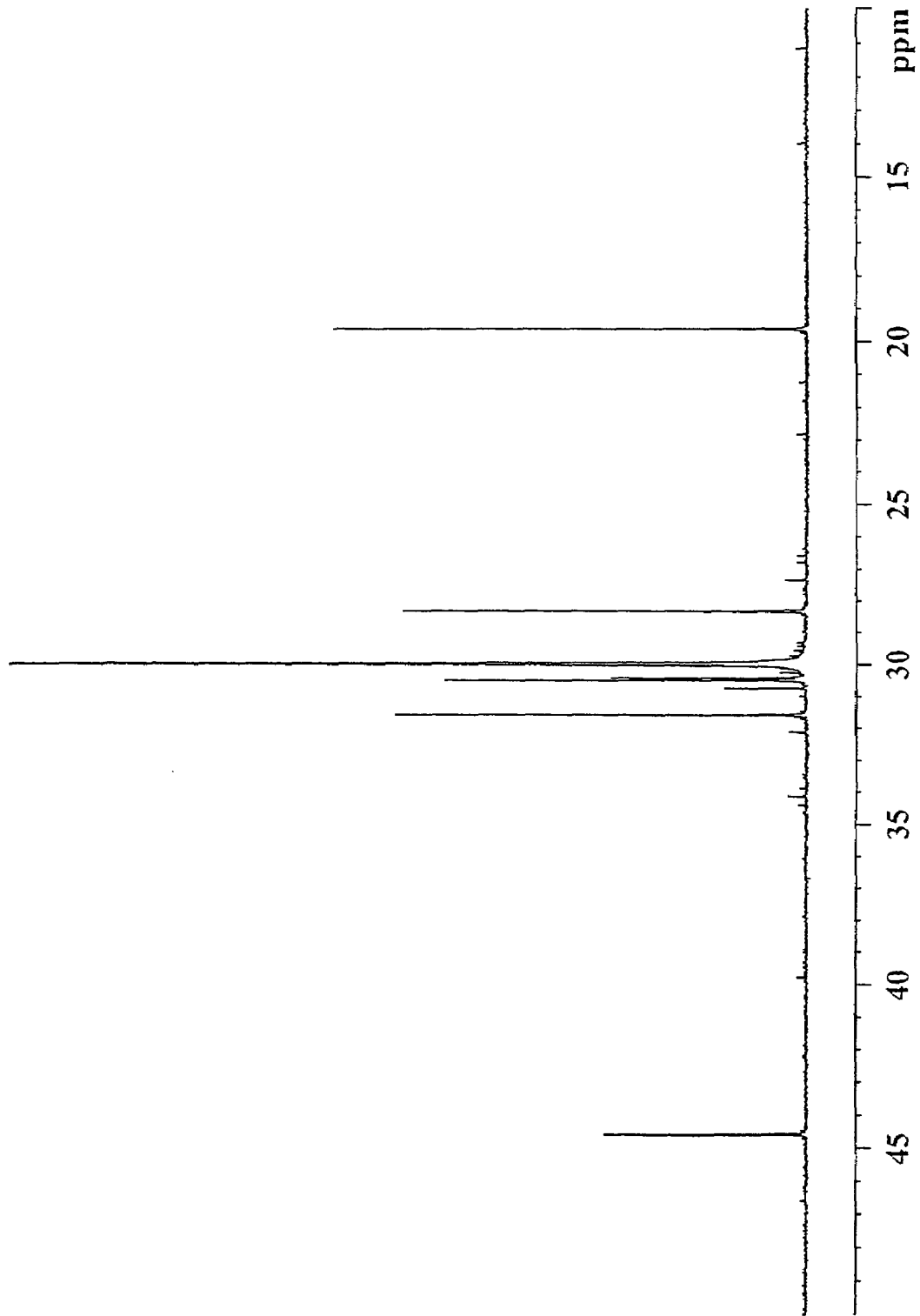
FIG. 9 is a $^{13}C$-NMR spectrum of the polymer obtained in Example 9.

The $^{13}$C-NMR spectrum of the polymer thus obtained is shown in FIG. 9. The polymer was confirmed to have a structure in which carbon atoms substituted with isopropyl groups were separated from each other by one methylene group.

EXAMPLE 10

The same operation as in Example 9 was carried out except that the amount of charged vinylcyclohexane in Example 9 was changed from 10.5 g to 31.6 g, the amount of dehydrated toluene was changed from 130 ml to 88 ml, the amount of the solution of methylalumoxane in toluene [MMAO produced by TosohAkzo Corp., Al atom converted concentration=6 wt %] was changed from 2.4 ml to 2.9 ml, and the solution in which 0.4 mg of isopropylidenebis (indenyl) zirconium chloride was dissolved in 0.9 ml of dehydrated toluene was changed to a solution in which 4.3 mg of isopropylidenebis(indenyl)zirconium chloride was dissolved in 8.7 ml of dehydrated toluene, to give 0.17 g of a polymer. The content of the 3-methyl-1-butene unit in the polymer was 9.1 mol %.

Figure 10:
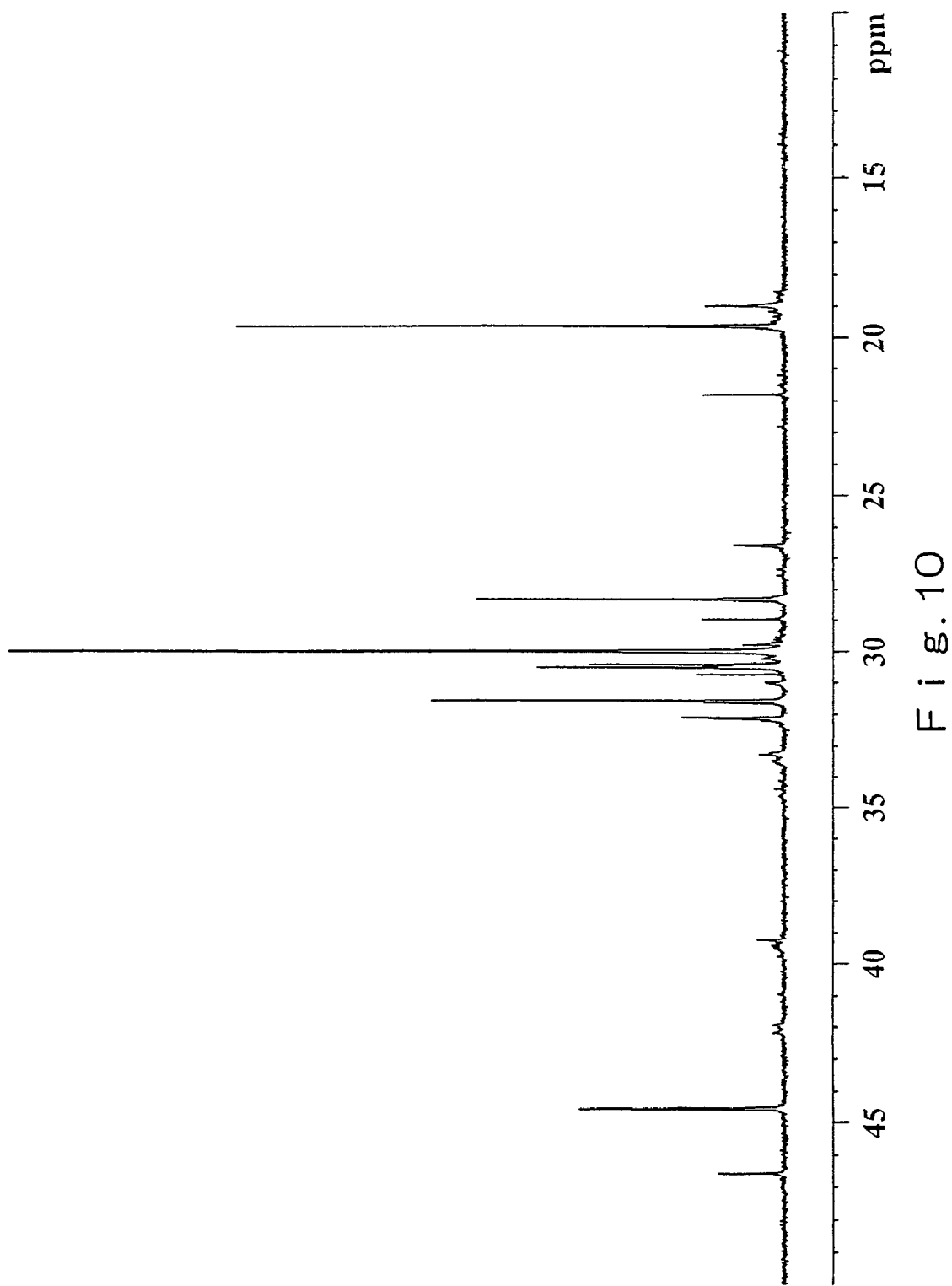
FIG. 10 is a $^{13}C$-NMR spectrum of the polymer obtained in Example 10.

The $^{13}$C-NMR spectrum of the polymer thus obtained is shown in FIG. 10. The polymer was confirmed to have a structure in which carbon atoms substituted with isopropyl groups were separated from each other by one methylene group.

[Preparation Example of Adhesive and Laminate]

A polypropylene(manufactured by Sumitomo Chemical Co., Ltd., Noblen AY564) was molded into a film of 100 μm in thickness using an 20 mmφ extruder with a T-die (LABO-PLASTOMILL manufactured by Toyo Seiki Co., Ltd.), and the film was used as an adherend. Further, the same polypropylene was molded into a sheet of 2 mm-thick using a 5.5-ounce injection molding machine (manufactured by Toshiba Machine Co., Ltd., IS 100E) and the sheet was used as a sdherend.

A steel plate (4 mm in thickness), aluminum plate (200 μm), polytetrafluoroethylene sheet (200 μm), [the polymer obtained in the Example shown in Table 3 and 50 μm PET(polyethylene telephthalate) frame], polytetrafluoroethylene sheet (200 μm), aluminum plate(200 μm) and steel plate (4 mm in thickness) were piled in these order and hot-pressed at 180° C. under a pressure of 5 MPa with a hot press molding machine to obtain a sheet-like adhesive.

Next, an aluminum foil, an adherend (a polypropylene film having a thickness of 100 μm), the sheet-like adhesive, an adherend(the polypropylene sheet having a thickness of 2 mm described above) and an aluminum foil from the top were laminated in these order, and thus obtained laminate was kept under 180C under a pressure of 0.3MPa for 3 seconds to adhere a part of the laminate (25 mm width). After peeling off the aluminum foils, the laminate was allowed to stand for 1 hour at a temperature of 23° C. at a humidity of 50%. Thereafter, the laminate was cut to 10 mm width×100 mm length(adhered length of 25 mm), parts not adhered of the laminate were held and peel test was carried out at a peeling rate of 100 mm/second at peel angle of 180. The peel strength to the polypropylene is shown in Table 3.

COMPARATIVE EXAMPLE 1

Copolymerization of ethylene and styrene was continuously conducted using a 100L-polymerization reactor made of stainless steel. 84.7 kg/hour of hexane as a polymerization medium, 2.8 kgt/hour of ethylene and 4.15 kg of styrene were continuously fed from the lower part of the reactor into the reactor. As a catalyst, isopropylidene (cyclopentadienyl) (3-tert-butyl-5-methyl-2-phenoxy)titaniu m dichloride, N,N-dimethylaniliniumtetrakis (pentafluorophenyl)borate and triisobutylaluminum were continuously fed from the lower part of the reactor into the reactor at rates of 0.348 g/hour, 1.081 g/hour and 6.912 g/hour, respectively.

On the other hand, a polymerization liquid was continuously taken out from the upper part of the reactor so that the volume of the polymerization liquid in the reactor was adjusted to 100 L. The copolymerization was carried out at 50° C. by circulating cooling water through a jacket mounted outside of the reactor. A small amount of ethanol was added to the polymerization liquid taken out from the reactor to terminate the polymerization, and removal of the monomers, washing with water, and then removal of the solvent by steam stripping in a large amount of water were carried out to obtain a copolymer, and the copolymer was dried under reduced pressure at 80° C. for a night and day. The melting curve of the copolymer thus obtained was measured at a heating rate of 10° C./min. with a differential thermal analysis apparatus (manufactured by Seiko Instruments Co., Ltd. DSC220). From the melting curve, the copolymer had a melting point of 44° C. and a glass transition point of −20° C. The styrene content of the copolymer measured with $^{13}$C-NMR analysis (manufactured by JOEL JNM-EX270, measuring solvent; orthodichlorobenzene, measuring temperature; 135° C.) was 16 mol %.

An adhesive and laminate were also prepared according to the Preparation Example of adhesive and laminate described above. The peel strength to the polypropylene of the laminate is shown in Table 3.

The adhesiveness of the copolymer of ethylene and styrene was extremely low.

COMPARATIVE EXAMPLE 2

A low density polyethylene(manufactured by Sumitomo Chemical Company, Ltd. Sumikathene L705) was used as an adhesive.

An adhesive and laminate were also prepared according to the Preparation Example of adhesive and laminate described above. The peel strength to the polypropylene of the laminate is shown in Table 3. The adhesiveness of the polyethylene having no bulky substituent in the skeleton was extremely low.

TABLE 3

| | | | Example | | | | Comparative Example | |
|---|---|---|---|---|---|---|---|---|
| | | | 5 | 6 | 7 | 8 | 1 | 2 |
| Adhesive | Monomer | Kind (mol %) | C2* (84) | C2* (75) | C2* (66) | C2* (47) | C2* (84) | C2* (100) |
| | | Kind (mol %) | VCH** (16) | VCH** (25) | VCH** (34) | VCH** (53) | Styrene (16) | None |
| | | Es | −1.81 | −1.81 | −1.81 | −1.81 | −1.01 | |
| | | B1 | 1.91 | 1.91 | 1.91 | 1.91 | 1.71 | |
| | Mn | | 46,000 | 47,000 | 31,000 | 22,000 | 204,000 | 26,000 |
| | Mw/Mn | | 2.9 | 2.1 | 2.4 | 4.2 | 2.9 | 18.9 |
| | Tg (° C.) | | −20 | −25 | 1 | 52 | −20 | Not measured |
| Peel strength of laminate | | | 10.4 | 8.7 | 9.8 | 8.2 | 1.9 | 0.1 |

*C2: Ethylene
**VCH: vinylcyclohexane

As described above, according to the present invention, there is provided a copolymer that is capable of having a constitution not containing any halogen regarded as being problematic from the viewpoint of environmental pollution, the copolymer being excellent in transparency, damping property, viscoelasticity and adhesiveness as well as in balance between flexibility and heat resistance, and a molded article, adhesive and laminate using the same.

The invention claimed is:

1. A copolymer of ethylene and a vinyl compound (I) selected from the group consisting of vinylcyclohexane and 3-methyl-1-butene wherein, the copolymer has a structure in which carbons substituted with a cyclohexyl group or isopropyl group are separated from each other by one methylene unit in its skeleton and the content of a unit derived from the vinyl compound (I) in the copolymer is from 5 to 90 mol %.

2. The copolymer according to claim 1, wherein the content of a unit derived from the vinyl compound (I) in the copolymer is from 5 to 25 mol %.

3. The copolymer according to claim 1, wherein the vinyl compound (I) is vinylcyclohexane.

4. A molded article comprising the copolymer of claim 1.

5. The molded article according to claim 4, the molded article is a film, a sheet or a pipe.

6. An adhesive comprising the copolymer of claim 1 as an effective ingredient.

7. A laminate comprising the copolymer of claim 1.

8. The cop olymer according to claim 1, wherein the copolymer has no crystallinity.

9. The copolymer according to claim 1, wherein the content of a unit is derived from the vinyl compound (I) in the copolymer is from 40 to 90 mol %.

10. The copolymer according to claim 8, wherein the content of a unit derived from the vinyl compound (I) in the copolymer is from 40 to 90 mol %.

11. The adhesive according to claim 6, wherein the adhesive contains a solvent of 150 to 3000 parts by weight per 100 parts by weight of the copolymer.

* * * * *